United States Patent [19]
Daboub

[11] Patent Number: 4,757,189
[45] Date of Patent: Jul. 12, 1988

[54] APPARATUS FOR CODING REUSABLE ENVELOPES

[76] Inventor: Henry A. Daboub, 1420 Grand Teton, DeSoto, Tex. 75115

[21] Appl. No.: 835,947

[22] Filed: Mar. 4, 1986

[51] Int. Cl.$^4$ .............................................. G06K 7/10
[52] U.S. Cl. .................................... 235/462; 235/432; 235/375; 235/476
[58] Field of Search ............... 235/375, 432, 462, 475, 235/476

[56] References Cited

U.S. PATENT DOCUMENTS

| | | | |
|---|---|---|---|
| 3,703,628 | 11/1972 | Philipson | 235/432 |
| 4,092,525 | 5/1978 | Daboub et al. | 235/463 |
| 4,146,175 | 3/1979 | Daboub et al. | 235/462 |
| 4,175,694 | 11/1979 | Donabin | 235/476 X |
| 4,567,357 | 1/1986 | Fedele | 235/476 X |

*Primary Examiner*—David L. Trafton
*Attorney, Agent, or Firm*—Drude Faulconer

[57] ABSTRACT

An apparatus for printing a new code on a reusable envelope having more than one space thereon available for printing such codes. The apparatus is comprised of an encoding means for generating a print signal representative of the new code to be printed and a print means (e.g. ink jet printer) is positioned downstream from the encoding means. A transport means moves the envelope from the encoding means and past the print means. A code detection means, e.g. bar code reader (BCR) detects any old codes on the envelope and locates the next available unused space thereon and generates a delay signal which is representative of the position of the unused space. This delay signal is sent to a delay means which, in turn, delays the print signal to the print means until the located unused space lies adjacent the print means.

10 Claims, 2 Drawing Sheets

APPARATUS FOR CODING REUSABLE ENVELOPES

DESCRIPTION

1. Technical Field

The present invention relates to coding reusable envelopes or like articles and more particularly relates to an apparatus which will locate an unused space on a reusable envelope and activate a print means to print a code in said space as the envelope moves from an encoding means past the print means.

2. Background Art

It is a routine practice within large companies, governmental agencies, or similar organizations to use reusable envelopes to move correspondence between internal mail stops. The most common type of such an envelope is one that has several address blocks on the front and/or back which are to be sequentially used in a prescribed order. That is, when an envelope is to be reused, the last address is marked out or ignored and the new address is filled into the next available address block.

In recent years, the volume of such internal correspondence has grown in some organizations to a point where it is now costly and extremely time consuming to continue to manually sort this mail for delivery. Accordingly, ways of automating the sorting of this internal correspondence are now under serious consideration within the industry. For example, equipment is currently available which takes stacks of envelopes and feeds them individually to a viewing station where an operator reads the address and operates a keyboard to input a code representative of the address into a print means. When the entry is complete, the print means is activated to print indicia (bar code) on the envelope that corresponds to the address. Envelopes are collected from several operators and are run through high speed sorters which electronically read the codes and directs all envelopes having the same code to a separate stacker bin or pocket which has been designated for that code. Examples of such commercially - available equipment are: Model MC-2000, a free standing coding station for printing codes on envelopes; Model NPI-1200 Mail Sorter, a high speed sorter for sorting envelopes; and Model MCS-6000, a high speed sorter having one or more coding stations as an integral part thereof; all of which are manufactured and distributed by National Presort, Inc., Dallas, Tex.

In equipment of this type, the means used for reading the codes on the envelope can be designed to search a particular area of an envelope and read the last code printed in this area. However, heretofore, the means for printing the code on the envelope has been limited to printing the code at approximately the same position on each envelope as it is automatically positioned in front of the printer. Thus, it can be seen that this limitation makes the use of such equipment impractical for coding reusable envelopes since, in an automated mode, a new code could only be printed over a previously printed code. Accordingly, an envelope can only be used once on the front and once on the back unless the operator manually positions the envelope in front of the printer, thereby losing any benefits otherwise gained in automating the handling of reusable envelopes.

DISCLOSURE OF THE INVENTION

The present invention provides an apparatus for printing a new code on a reusable envelope which has more than one space thereon available for printing such codes so that the envelope can be reused until all available spaces have been used.

The present apparatus is comprised of an encoding means which is operated by an operator for generating a print signal representative of the new code to be printed. This print signal is temporarily stored in a central processing unit (CPU). A print means (e.g. ink jet printer) is positioned downstream from the encoding means and a transport means moves the envelope from the encoding means and past the print means. The present apparatus includes a code detection means, e.g. bar code reader (BCR), which detects any old codes printed on the envelope and locates the next available unused space thereon. The code detection means generates a delay signal which is representative of the position of the unused space on the envelope and transmits this delay signal to a delay means which, in turn, delays the print signal to the print means until the located unused space lies adjacent the print means.

BRIEF DESCRIPTION OF THE DRAWINGS

The actual construction, operation, and apparent advantages of the present invention will be better understood by referring to the drawings in which like numerals identify like parts and in which.

BEST MODE FOR CARRYING OUT THE INVENTION

Figure 1:
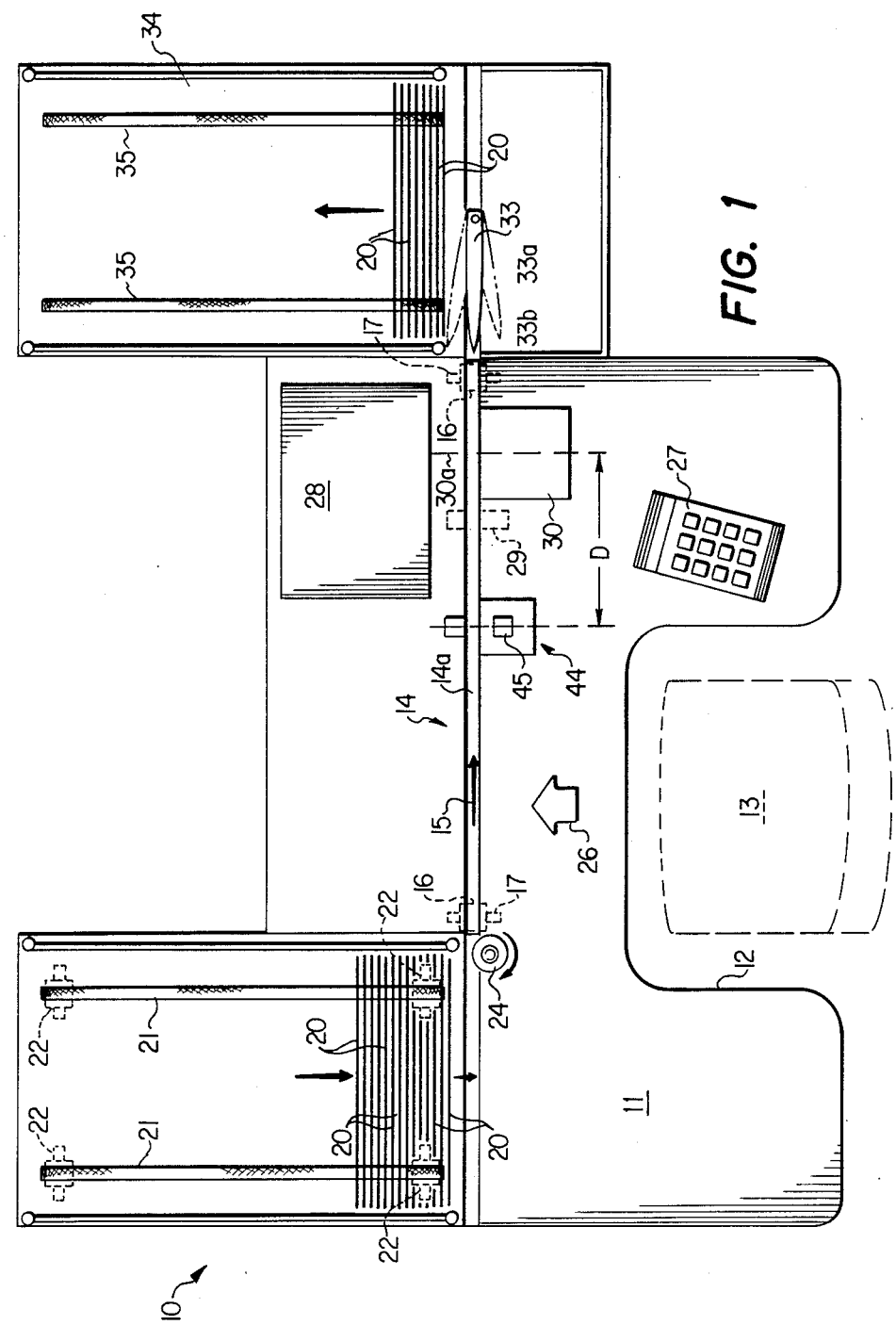
FIG. 1 is a top view of an encoding apparatus in which the present invention is incorporated.

Referring more particularly to the drawings, FIG. 1 is a plan view of a typical code desk 10 which is used to print codes onto envelopes so they can then be handled by automated sorting equipment. As shown, code desk 10 is comprised of a desk top 11 having a recess 12 therein at which an operator (not shown) sits in chair 13. Transport 14 runs along the back of top 11 and is comprised of a flat continuous belt 14a that is moved in the direction shown by arrow 15 by pulleys 16 mounted on drive shafts 17. Magazine 18 opens onto transport 14 and is adapted to receive a stack of envelopes 20 which is moved forward in magazine by a pair of continuous belts or chains 21 mounted on pulleys 22. As envelopes 20 are moved forward, they are picked off one-by-one by pick-off means 24 and placed on belt 14a of transport 14 which, in turn, moves and stops the envelope 20 at viewing station 26 in front of an operator.

The operator reads the last address and enters a code corresponding thereto into encoding means 27, e.g. standard keyboard or keypad, which, in turn, inputs a corresponding print signal to a dedicated CPU 28, e.g. Apple II computer. When entry is completed and entered (e.g. Enter button is pushed on means 27), transport 14 is activated to move the envelope 20 down the transport and past photocell 29 which generates a signal when the leading edge of the envelope is detected to call the print signal from the CPU 28 and to instruct print means 30 to print the desired code on the envelope. Preferably, print means 30 is a ink jet printer capable of printing a bar code, e.g. Model 80-I, distributed by Siemens, Munich, West Germany; although other print means can be used without departing from the present invention.

The envelope continues past print means 30 on transport 14. Gate 33 is actuated to position 33a to divert envelope 20 into stacker pocket 34 which has take-away belts or chains 35 to move the stacked envelopes back into pocket 34. If the envelope has no code or is otherwise deficient, the operator can hit a reject key on means 27 whereby no code is printed and gate 33 is moved to the position 33b to deflect the defective envelope into reject pocket 39 (e.g. basket). The equipment as described to this point is well known and is commercially available, e.g. NPI Model MC-2000 Code Desk, manufactured by National Presort, Inc., Dallas, Tex.

As can be seen from the above description, since the print means 30 is activated by the leading edge of an envelope breaking a photocell beam 29, the code will always be printed in the same relative place on each envelope. If a code has already been printed in this place on an envelope, as is likely the case with a reusable envelope, the new code will be printed over the old code which is obviously unacceptable.

In accordance with the present invention, a means is incorporated into equipment such as decribed above which makes it capable of coding reusable envelopes even where one or more old codes are already present thereon. As should be understood, the present means although described as being incorporated into a freestanding code desk 10, can be incorporated equally as well with other equipment of this basic type, e.g. integrated encoding and sorting equipment.

Figure 2:
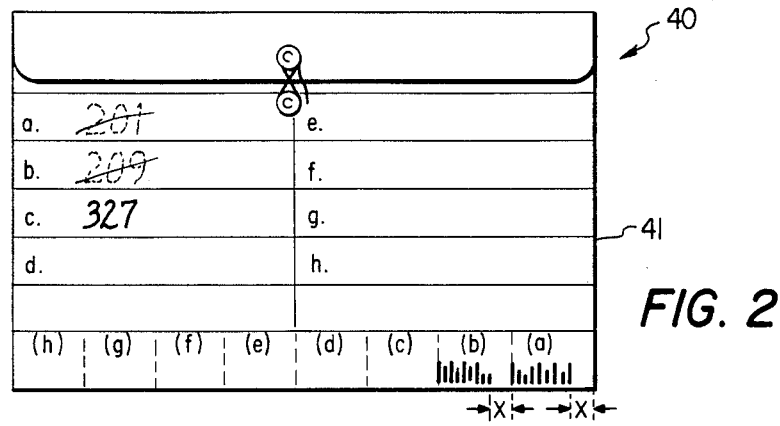
FIG. 2 is a perspective view of a typical reusable envelope which can be used with the present invention.

To better understand the present invention, reference is made to FIG. 2 which illustrates a basic type of reusable envelope 40 in wide use today. Only the back of envelope is shown but the front is basically the same and is used in the same manner. This type of envelope has a plurality of address blocks, a–h, ruled off which are to be used in order, e.g. a, b, g. In accordance with the present invention, a plurality of codes (e.g. bar codes) are to be individually imprinted at different times in a longitudinal line across the envelope (e.g. along and just above the bottom edge as shown in FIG. 2). That is, for the sake of illustration, envelope in FIG. 2 has had two previous addresses a. and b. code into their respective places (a) and (b) along the lower edge. Note that the first code (a) begins at a distance x (e.g. ¼ inch) from the leading edge 41 of the envelope and the distance between the end of one code and the beginning of the next code is also x.

Figure 3:
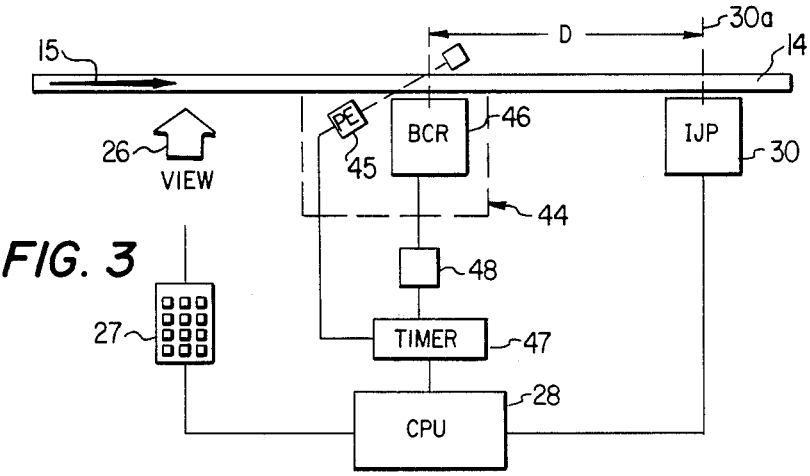
FIG. 3 is a block diagram of the control circuitry of the present invention.

In accordance with the present invention, the envelope 40 is positioned at viewing station 26 (FIG. 1) and an operator reads the last address "327" in block c and enters this information to CPU 28 by means of keying means 27. When the entry is completed, the transport 14 is activated and carries envelope 40 from the viewing station 26 and past code detection means 44 (FIGS. 1 and 3). Code detection means 44 is comprised of a sensor means 45 and a light sensing means, e.g. bar code reader (BCR) 46. Sensor means 45 (e.g. photocell) senses the leading edge 41 of envelope 40 and generates a start signal to start delay means, e.g. timer 47 (FIG. 3), which, in turn, acts to delay the activation of printing means 30. The actual time of this delay is equal to the time T which it takes for leading edge 41 of envelope 40 to travel the distance D from (1) the optical centers of sensor means 45 and BCR 46, which are aligned, and (2) the print head 30a of print means 30 plus the distance x (FIG. 2) and can be expressed as:

$$T(\text{sec}) = \frac{D(\text{in.}) + x(\text{in.})}{R}$$

R = speed of transport (in/sec)

If there is no previous code on envelope 40, e.g. no code in (a) of FIG. 3, edge 41 breaks photocell 45 which starts timer 47 which, in turn, counts down time T at which time, timer 47 generates a signal to CPU 28 to activate print means 30. Envelope 41 has now traveled down transport 14 and is properly positioned in front of print head and the proper indicia of the code is printed in place (a) on the envelope. However, if one or more codes, e.g. (a) and (b), are on envelope 41, light sensitive means 46 detects the code and generates a delay signal for each indicia (e.g. individual bar) of the code or codes. Each delay signal is continuously fed to reset means 48 (FIG. 3) which, in turn, resets timer 47 to original delay time T each time it receives an individual delay signal. Accordingly, timer 47 is continuously being reset to time T for so long as any indicia of a previous code is being detected by means 46. Once all of the previous codes clear means 46, timer 47 will continue without further resetting to count down time T and generate a signal which operates print means 30 to print the stored code in CPU 28 in its appropriate unused place on envelope 40, e.g. (c) in FIG. 2.

Figure 4:
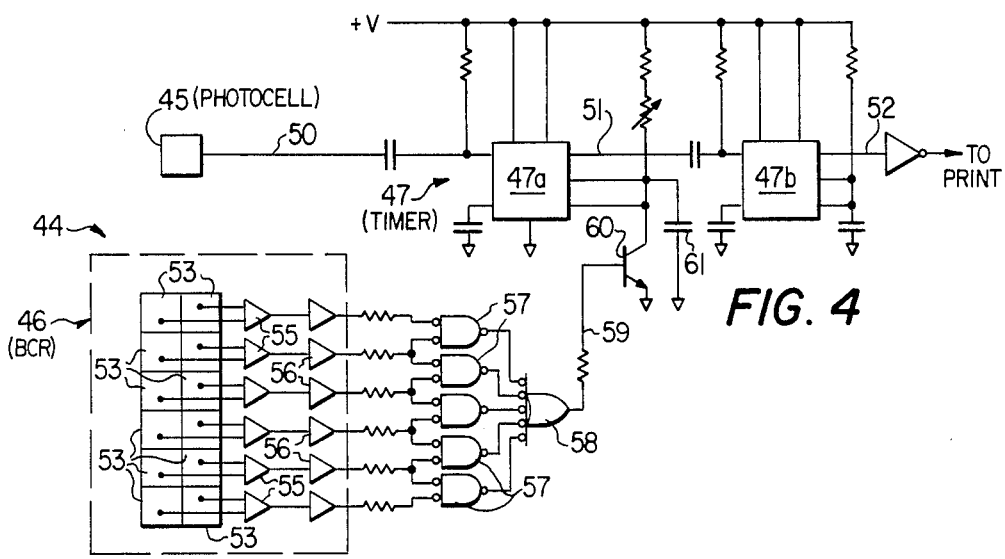
FIG. 4 is a more detailed circuit diagram of FIG. 3.

For a more detailed description of the circuitry involved in the present invention, reference is made to FIG. 4. As an envelope passes photocell 45, a start signal is generated thereby which is transmitted via line 50 to start timer 47, which, as shown, is comprised of two electronic chips 47a and 47b (e.g. Model No. 555 timer chips, which are available from a multitude of commercial sources). As will be understood in the art, chip 47a is programmed to "count down" the delay time T, as defined above, and then emit a signal via line 51 to chip 47b which acts as a pulse generator to generate a signal via line 52 to operate print means 30. In most practical applications, the delay time T ranges between 100 and 220 milliseconds but will vary depending on the distance D (FIG. 1) and the speed of transport 14.

As explained above, if a code is detected by BCR 30, a delay signal is generated to reset timer 47 to the full delay time T. Again looking at FIG. 4, a simplified BCR 30 is illustrated which is capable of detecting the presence or absence of individual indicia (e.g. bars) of a code. As will be understood in the art, a plurality of photo-diodes are paired to provide sufficient viewing width to insure that a delay signal will only be generated by a relatively broad indicia and not by a "fly speck" or similar "noise" on the envelope. Likewise the pair of diodes are stacked to span completely across the height of the space on the envelope in which an individual indicia of a code will lie. Diodes 53 are light sensing devices whose outputs increase in direct proportion to the intensiveness of the light impringing thereon, thus being sensitive to the dark indicia in respect to the lighter background of the envelope. For a more complete discussion of typical BCR technology, see U.S. Pat. No. 4,092,525.

Signals generated by indicia passing any pair of diodes 53 is applied to their respective amplifiers 55 and then to comparators 56 to amplify and digitized the signals. The output of each comparator 56 is inverted and fed to one of AND gates 57.

It can be seen that any one of AND gates 57 has to receive a signal from both of the stacked diodes 53 connected thereto in order for an output signal to be emitted therefrom. This is to insure that a detected mark on the envelope is of sufficient width and length to originate from an indicia mark and not from an extraneous mark on the envelope. All of the outputs of AND gates 57 are connected to OR gate 58 so that gate OR 58 will output a signal upon receiving a signal from any one or more of the AND gates 57. Any output signal from OR gate 58 when applied to transistor 60 (reset means 48 in FIG. 3) through line 59 will "shortout" capacitor 61 which, in turn, resets timer chip 47a to the full delay time T.

Again, it can be seen that as long as any indicia of a previously printed code is passing in front of BCR 46, a delay signal therefrom will continuously reset timer 47 until the entire code or codes has passed BCR 46. At that time, no further signals will be generated by the BCR 46 so timer chip 47a will be free to continue to count down, thereby generating a signal to operate print means 30.

What is claimed is:

1. Apparatus for printing a new code on an unused space on a reusable envelope having more than one space thereon available for printing such codes, said apparatus comprising:
   encoding means for generating a print signal representative of said new code;
   print means for printing said new code on said unused space on said envelope upon receipt of said print signal;
   transport means for moving said envelope from said encoding means past said print means;
   code detection means for locating said unused space on said envelope as said envelope moves from said encoding means to said print means and generating a delay signal representative of the position of said unused space; and
   delay means responsive to said delay signal for delaying said print signal to said print means until said unused space on said envelope is adjacent said print means.

2. The apparatus of claim 1 wherein said code detection means comprises:
   a start means which generates a start signal in response to said envelope passing said start means; and
   light sensitive means for generating said delay signal whenever an indicia of a previously printed code passes said light sensitive means.

3. The apparatus of claim 2 wherein said indicia is a bar of a bar code and wherein said light sensitive means comprises a bar code reader.

4. The apparatus of claim 2 wherein said delay means comprises:
   a timer means responsive to said start means for delaying said print signal to said print means for a delay time equal to the time required for said envelope to move from said start means to said print means; and
   reset means responsive to said delay signal for resetting said delay means to said delay time upon receipt of said delay signal.

5. Apparatus for printing a new code on an unused space on a reusable envelope having more than one space available for the printing of such codes, said apparatus comprising:
   encoding means for generating a print signal representative of said new code;
   print means responsive to said print signal for printing said new code on said envelope;
   transport means for moving said envelope from said encoding means past said print means;
   code detection means positioned along said transport means between said encoding means and said print means for detecting any code previously printed on a used space on said envelope as said envelope moves past said detection means and for generating a reset signal in response to any detected code;
   a start means for generating a start signal as said envelope reaches said detection means;
   a delay means responsive to said start signal for delaying said print signal to said print means for a delay time equal to the time required for said envelope to move from said start means to said print means; and
   reset means responsive to said reset signal for resetting said delay means to said delay time upon receipt of said reset signal.

6. The apparatus of claim 5 wherein said code detection means comprises:
   light sensitive means for generating a signal in response to the light intensity impinging from said code.

7. The apparatus of claim 6 wherein said previously printed code is a bar code and said code detection means comprises:
   a bar code reader.

8. The apparatus of claim 5 wherein said start means comprises:
   a photocell optically aligned with said detection means and adapted to generate said start signal when the leading edge of said envelope passes said photocell.

9. The apparatus of claim 8 wherein said delay means comprises:
   a timer means responsive to said start signal set to a delay time equal to the time the leading edge of the envelope takes to move from said start means to a point slightly past said print means.

10. The apparatus of claim 9 wherein said point slight past said print means is equal to the distance on said envelope that the first of said more than one available spaces for printing said code is spaced from said leading edge of said envelope.

* * * * *